United States Patent [19]

Holmberg

[11] 4,028,244

[45] June 7, 1977

[54] APPARATUS FOR ESTABLISHING CONTACT BETWEEN A LIQUID AND A GAS

[75] Inventor: Leif Holmberg, Dragor, Denmark

[73] Assignee: European Plastic Machinery Mfg. A/S, Kopenhamn S, Denmark

[22] Filed: Oct. 10, 1975

[21] Appl. No.: 622,278

Related U.S. Application Data

[63] Continuation of Ser. No. 495,002, Aug. 5, 1974, Pat. No. 3,956,127, which is a continuation of Ser. No. 326,725, Jan. 26, 1973, abandoned.

[30] Foreign Application Priority Data

Jan. 26, 1972 Sweden .................................. 72847

[52] U.S. Cl. .................................................. 210/150
[51] Int. Cl.² ............................................ C02C 5/10
[58] Field of Search ...... 210/150, 151, 220, 242 R, 210/242 A; 261/92, 94, 95

[56] References Cited

UNITED STATES PATENTS

| 1,811,181 | 6/1931 | Maltby | 210/150 |
| 3,122,594 | 2/1964 | Kielback | 261/94 |
| 3,540,589 | 11/1970 | Boris | 210/150 |
| 3,688,905 | 9/1972 | Nordgard | 261/92 X |
| 3,747,904 | 7/1973 | Gross | 261/92 |

*Primary Examiner*—Gerald A. Dost
*Attorney, Agent, or Firm*—Beveridge, DeGrandi, Kline, Lunsford

[57] ABSTRACT

An apparatus for establishing contact between a liquid and a gas comprising a cylindrical container which is arranged to rotate about its axis and has at least the circumferential wall perforated so that the liquid and the gas can flow therethrough, and which is packed with filling bodies.

9 Claims, 2 Drawing Figures

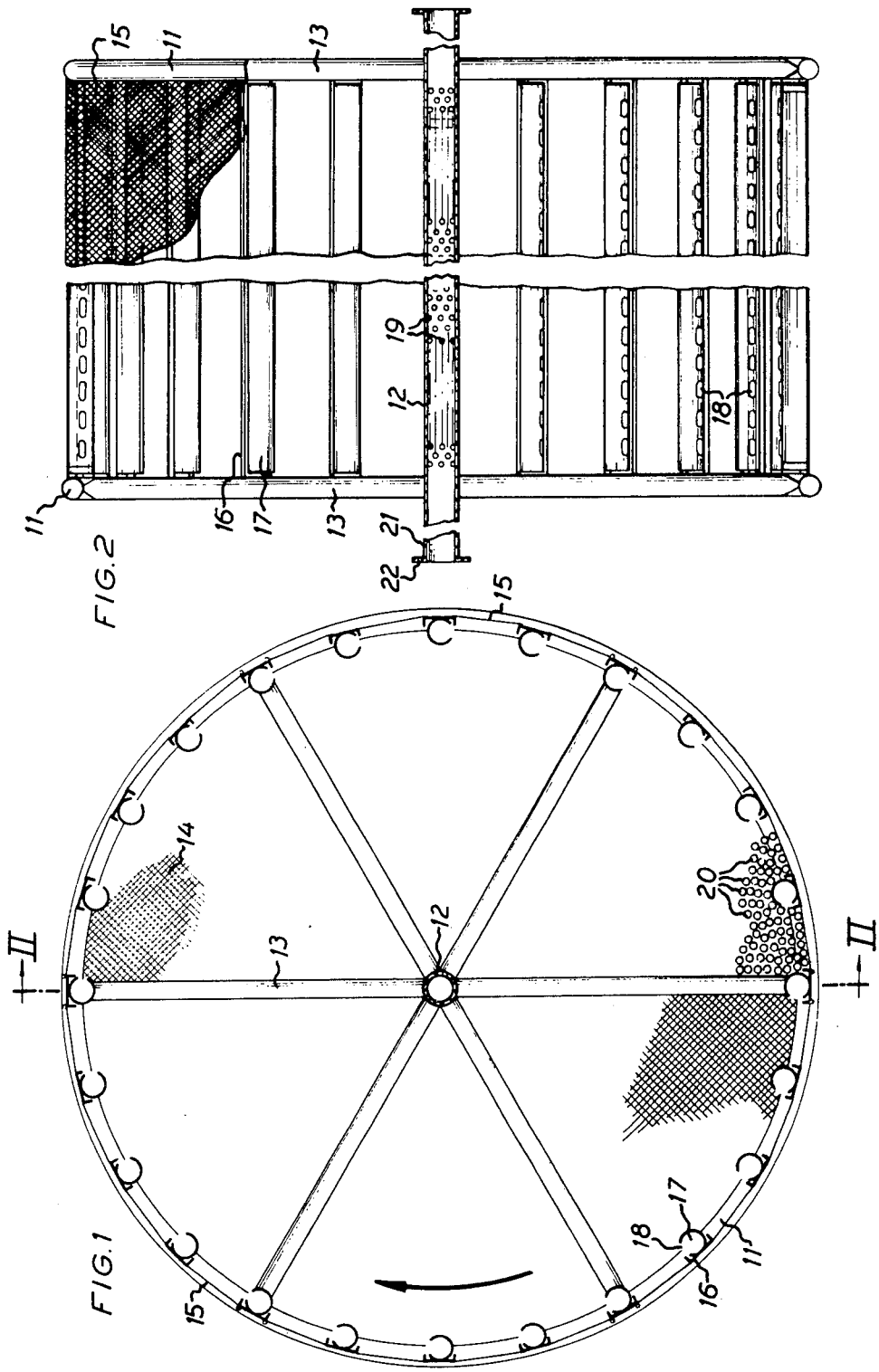

APPARATUS FOR ESTABLISHING CONTACT BETWEEN A LIQUID AND A GAS

This is a continuation of application Ser. No. 495,002, U.S. Pat. No. 3,956,127, filed Aug. 5, 1974, which is a continuation of Ser. No. 326,725, filed Jan 26, 1973 now abandoned.

This invention relates to an apparatus for establishing contact between a liquid and a gas, for instance a filter for microbiological purification of water contaminated with organic matter, or for cleaning of flue gases and fumes. According to the invention, the apparatus comprises a cylindrical container which is packed with filling bodies and mounted for rotation about a horizontal axis, at least the circumferential wall of the cylinder being perforated so that the liquid and the gas can flow therethrough.

In one embodiment the apparatus according to the invention comprises means disposed inside and/or outside the cylindrical circumferential wall of the container and adapted, when the cylinder rotates immersed in a liquid, to raise the liquid over the liquid level and upon continued rotation of the cylinder to pour said liquid over the filling bodies, and means entraining air into the liquid and upon continued rotation of the cylinder delivering the air to the liquid below the filling bodies. These means preferably are pipes parallel with the axis of the cylinder and symmetrically distributed about the circumferential wall of the cylinder, said pipes having orifices of lesser size than that of the filling bodies directed substantially in the direction of rotation of the cylinder.

The filling bodies that are used in the apparatus according to the invention preferably are lightweight spherical hollow bodies, preferably plastic balls.

In sewage treatment the sewage is usually caused first to flow through a sand trap where the rate of flow is so adjusted that heavy particles, mainly sand carried along by the sewage, are separated. In conjunction with the sand trap use is made of a grid which retains large size objects which might cause trouble in the purification plant. The sand trap is followed by the preclarifying step which takes place in a sedimentation tank through which the water flows at so low a rate that the sludge therein will sink to the bottom of the tank. Usually, between 95 and 100% of the settleable solids are separated in the preclarifying plant, but mostly this corresponds only to 20 to 30% of the total amount of organic matter in the sewage. The remaining 70 to 80% occur in dissolved or colloidal form and cannot be separated by precipitation.

A more complete treatment of sewage can be realised by subjecting pretreated sewage to an aerobic microbiological purification, in which part of the dissolved or colloidal organic matter is converted by bacteria to sludge which is separated in a post-clarification tank. For attaining a better effect, some of the clarified water is usually recycled to the inlet of the microbiological purification step. Part of the sludge from the biological purification, generally 50%, is usually returned to the preclarification step and the sludge from the latter step is subjected to an anaerobic fermentation process, so-called putrefraction.

A conventional form of biological purification is performed in a so-called biological filter comprising a bed of granite chips serving as support for bacteria which adhere to the surface of the chips and there grow and build up a film while decomposing the organic matter in the sewage.

However, the conventional treatment of sewage, briefly outlined in the foregoing, is incomplete and suffers from other drawbacks. Thus, the purification plants occupy very large ground areas. The filters may easily be clogged by sludge and the flow of the sewage through them is canalized resulting in a reduced effect. In very cold weather the filter may freeze and it requires a long time to reach full capacity again. Furthermore, the sewage purification attainable in the filter is limited. The granite chips used as filling bodies are heavy and therefore difficult to handle.

One object of the present invention is to eliminate or reduce the disadvantages outlined above, from which the prior art purification plants suffer. This is attained by the new apparatus, defined in the appended claims, for establishing contact between a liquid and a gas. The invention generally aims at providing a novel and advantageous manner in which to bring a liquid into contact with a gas for realizing biological purification of sewage, purification of contaminated gases such as flue gases and fumes, cooling of gases and performing industrial processes in which a liquid and a gas are to be reacted with one another.

The apparatus according to the invention provides a more complete purification of sewage than that which can usually be attained in the conventional purification plants. Purification plants based on or containing filter apparatuses according to the invention can be made more compact and thus will require less space than conventional purification plants.

Because of the continuous rotation of the filter apparatus according to the present invention the direction of flow of the water passing therethrough is constantly altered, which implies that the filter is not very easily stopped and that a canalization of the liquid flow through the filter is prevented.

One of the advantages gained by the filter apparatus according to the present invention is that the immersion of the bulk of filling bodies in the water during the continuous rotation of the filter ensures a complete humidification of the entire biofilm formed on the filling bodies. This effect is still further increased by the above mentioned means which upon rotation of the filter raise the liquid above the liquid level and pour it over the filling bodies.

By the rotation of the filter apparatus fresh air will constantly be sucked in on that side of the filter where the filling bodies emerge from the liquid. Likewise, air is forced out on that side of the filter where the filling bodies move down into the liquid. A good aeration of the filter is thus ensured, which furthers the growth of the microorganisms that realize the biochemical purification of the sewage.

A modification of the speed of rotation makes it possible to reduce or increase the flushing action for attaining an optimum exploitation of the purifying effect of the microrganisms.

A filter apparatus according to the invention has a very low energy consumption since the filter generally is partially immersed in the liquid to be purified and, as a consequence, it exerts only a slight pressure on the bearings so that but insignificant energy is required for the requisite relatively slow rotation of the filter.

Due to the continuous rotation of the filter there is a reduced risk that the filter will freeze in winter, and this risk can be further reduced by the injection of preheated air through perforations in the hollow shaft of the filter.

Further, there is no need any more for the heavy granite chips which are so difficult to handle in conventional biological filters. The lightweight plastic balls preferably used according to the present invention are much more easily handled and offer a good support for the microorganisms which realize the biological purification of the sewage.

A filter apparatus according to the present invention will be more fully described hereinbelow with reference to the accompanying drawings in which:

FIG. 1 is a cross section of a filter apparatus;

FIG. 2 mainly is a section on line II—II in FIG. 1.

In the cylindrical filter illustrated in the drawing each end wall is formed by a pipe 11 bent into circular form, six tubular supports 13 arranged, in a manner similar to the spokes of a wheel between said pipe 11 and the hollow central shaft 12 or the filter cylinder, and a netting 14 covering the spaces between said pipes. Also, the circumferential wall surface of the cylinder, as illustrated in the upper right portion of FIG. 2, is covered with a netting 15 which is kept in position by means of braces 16 parallel with the shaft of said cylinder and spaced equal distances apart about the circumferential wall surface thereof. Mounted inside of, parallel with and closely adjoining each of the braces 16 is a pipe 17, and all pipes 17 have their orifices 18 facing in the direction of rotation of the cylinder, which is shown by an arrow in FIG. 1. The hollow shaft 12 of the cylinder within the part situated within the cylinder has a number of holes 19 for injecting air into the filter. The filter is packed with hollow filling bodies 20. The openings of the nettings 14 and 15, the orifices 18 of the pipes 17 and the holes 19 in the cylinder shaft 12 all are of smaller dimensions than the filling bodies 20 in order not to allow said bodies to pass. The ends 21 of the cylinder shaft protruding outside the end walls are provided with flanges 22 for connection with a drive which serves to rotate the filter and to connect, if desired, two or more filters to be driven in common. The filter cylinder can have its shaft ends 21 rotatably supported in bearings, or the filter may rest directly on the liquid surface with one shaft end 21 connected to a drive.

The configuration of the filter cylinder can be varied. In a suitable cylinder configuration the width and diameter of the cylinder are equal, but also other ratios of width to diameter are useful. Also, the size of the cylinder can be varied. A cylinder packed with lightweight plastic balls and intended for use as a biological filter may have a width and a diameter of 2 to 3 meters, preferably 2.5 meters, but other sizes are also conceivable.

Instead of the circular pipes 11 and the tubular supports 13 use can be made of structural material having a shape other than tubular. Moreover, the holes 19 in the cylinder shaft can be dispensed with, if air is not to be injected into the filter through the shaft, in which case the shaft need not either be hollow. The orifices 18 in the pipes 17 can be designed as slots extending substantially throughout the length of the pipes, but to increase the strength of the tubes the orifices are preferably formed as short slots.

The circumferential wall of the cylinder and the end wall surface thereof can be covered with metal netting or perforated metal sheet or other perforated material having sufficiently large openings to readily let through the liquid and the gas to be brought into contact with one another in the filter. In certain cases the end wall surfaces may be formed by imperforate metal sheet. For instance, a metal netting for the circumferential wall and end wall surfaces of the cylinder can have 30 mm openings when use is made of plastic balls with a diameter of 38 mm as a filling in the filter.

Instead of the means 17 inside the circumferential wall of the cylinder, which serve to raise liquid and pour it over the filling bodies and to entrain air into the liquid, similar means having the same function can be disposed outside the circumferential wall surface of the cylinder. If desired, particular means can be arranged to raise the liquid while other means are arranged to entrain air into the liquid.

As already mentioned, the filter apparatus according to the invention is rotated preferably partially immersed in the liquid to be brought into contact with a gas, for instance in sewage to be contacted with air for biological purification of the sewage water. The filter is preferably immersed in the liquid to such an extent that the liquid level lies immediately below the cylinder shaft. However, the filter apparatus can also be suspended in bearings above the liquid surface and the liquid be sprayed over the filter. In this case, the pipes 17 distributed about the periphery of the cylinder are dispensed with since they have no useful purpose any more.

The speed of rotation of the filter apparatus according to the invention can be modified for various purposes. With a biological filter having a diameter of 2.5 meters the speed of rotation may be for instance 1 to 2 revolutions per minute, but a higher or lower speed may also be used. It is recommended to use a variable speed drive so that, if necessary, the speed of rotation of the filter can be altered also in operation.

Filling bodies of different kinds can be employed in the filter apparatus according to the invention. Use is preferably made of lightweight hollow filling bodies, particularly hollow plastics bodies, such as plastics balls, suitably of a diameter of 30 to 60 mm. The plastic bodies can be made of polyethylene, particularly high-pressure polyethylene, polypropylene or other plastic materials. The cylinder is suitably filled altogether with filling bodies.

The filter apparatus according to the invention can be used in several fields where contact between a liquid and a gas is to be established, particularly as a biological filter for purification of water contaminated by organic matter, as a filter for purification of flue gases and fumes, for cooling hot gases and for other industrial uses in which a liquid and a gas are to be brought into contact.

For the purification of contaminated water the filter apparatus according to the invention can be used not only in the biological filter proper, but also for instance for reducing the degree of contamination of heavily contaminated waste water or sewage prior to the conventional purification or for post-purification of waste water or sewage that has been subjected to other purification processes. It can be used for improving the purification effect of already existent purification plants. It can be used in eutrophic lakes and slowly running water courses which are contaminated beyond their self-purification capacity.

Some examples of the use of the filter apparatus according to the invention in different fields are given in the following description.

The cylindrical filter apparatus according to the invention when used as a rotary filter for biological purification of waste water or sewage can be arranged partially immersed in the water of a tank having in its upper part an inlet for the water and in its lower part an outlet for sludge collecting beneath the filter. Either the shaft of the filter which is connected to a motor can be suspended in bearings, or the cylinder with the aid of the hollow filling bodies and without the aid of bearing devices can be arranged partially immersed in the water to be purified. The shafts of two or more filter apparatuses according to the invention can be coupled together to permit the filter apparatuses to be driven by a common motor. A large-capacity biological filter is obtained by arranging two or more rows of coupled filter apparatuses in the same tank or basin.

A tank for biological purification of waste water or sewage can be divided by transverse partitions into two or more compartments each containing one filter apparatus according to the invention, said partitions being so arranged that every second partition leaves a free space through which the liquid can flow along one longitudinal wall of the tank, and every second partition in the same way leaves a free space along the other longitudinal wall of the tank so that the liquid can flow through the tank from one filter to the other and be subjected to biological purification in several steps. The treated liquid can be clarified in the last compartment which to this end can be made larger than the other compartments, or the liquid can be clarified in a separate post-clarification tank.

Another possibility is to lead the sewage into an elongated vat which forms an oval path of flow for the water and has rotary filter apparatuses according to the invention partially immersed in the water, with the axes of said apparatuses transverse to the direction of flow. Apart from acting as biological filters for the purification of sewage, the filters can also serve as pumps to bring about the flow of water through the vat.

The filter apparatuses according to the invention can be disposed in an annular tank, the sewage being conducted in a circular path in the tank and the filters having their axes disposed transversely to the direction of flow of the water, a post-clarification tank being situated inside the annular tank, and the sewage being conducted to said post-clarification tank after it has been biologically purified in the annular tank.

Furthermore, filter apparatuses according to the invention can be disposed in a circular tank, for instance for pre-clarification of sewage, which tank is provided with a rotary bridge supporting a bottom raking arm, and the filter apparatuses can float on the liquid and be moved round in the tank by means of the bridge. This will provide a certain biological purification of the sewage simultaneously with the pre-clarification. In such a tank it is also possible to provide a two-step purification or even a three-step purification. It would be possible to carry out in the same tank in sequence firstly pre-clarification, secondly biological purification with the use of filter apparatuses according to the invention, and thirdly post-clarification, the filters being caused to rotate together with the bridge for the bottom raking arm, possibly with the circumferential walls of the cylinders facing the circumference of the tank and with the filters driven by a motor mounted on said bridge.

A compact plant for the purification of sewage with the use of filter apparatuses according to the present invention can also comprise an outer annular tank for pre-clarification, an intermediate annular tank for biological purification with the use of filter apparatuses according to the present invention, and an inner circular post-clarification tank, the filter apparatuses being again caused to rotate together with the bridge which supports the bottom raking arm or arms.

One or more filter apparatuses according to the present invention can also be disposed above the liquid level in a tank and sewage can be sprayed over the filter apparatuses which are simultaneously rotated so that the liquid is distributed over the filling bodies in the filter and comes in contact with the air in the channels between the filling bodies for providing a suitable environment for the microorganisms which realize the biochemical purification of the sewage. The filter apparatuses can be arranged in two or more steps in series with associated clarification tanks, the clarified liquid from the first step being possibly sprayed over the filter in the second step etc.

Biological purification of sewage with the use of the filter apparatuses according to the invention can also be combined with other purification steps, such as chemical precipitation with aluminium sulphate, iron chloride or calcium hydroxide for the removal of phosphates in a so-called third purification step.

The filter apparatus according to the invention can also to advantage be used for aeration and purification of lakes and water courses contaminated with organic matter. In this case, a number of filter apparatuses can be connected in series, the filters floating on the water partially immersed therein, without the aid of mechanical bearing devices, supported by the lightweight hollow filling bodies, and being driven in common by a motor mounted on a pontoon anchored in the lake. The motor can preferably be adapted to drive a shaft over a belt transmission or like mechanism, and a number of filter apparatuses according to the invention is connected to one or both ends of said shaft.

The filter apparatus according to the invention can be used also in absorption plants, for instance for the purification of flue gases and fumes. Such a plant may comprise a closed container holding a number of series-connected filters which are partially immersed in a bulk of water conducted through the lower part of the container, the circumferential walls of the filters being rotated very close to the dome of the container so that flue gases introduced into the upper part of the container through one end wall thereof are forced to flow through the filters axially thereof to be led away through an opening in the other end wall of the container. This will bring the flue gases in intimate contact with water that is raised from the bulk of water by the filling bodies, and the solids in the flue gases are carried along by the water to the bulk of water in the lower part of the container to be removed with it.

For flue gas purification the flue gases can also be injected through the perforated shaft of a filter apparatus according to the invention which rotates partially immersed in water, and the flue gases pass in an upward direction between the filling bodies and are washed clean by the water. The end walls of the filter cylinder may be imperforate. Alternatively, the flue gases can be sucked out through an outlet disposed above the filter.

Finally, the filter apparatus according to the present invention can also be utilized in a cooling plant for cooling hot gases which can be injected through the perforated shaft of the rotating filter which is partially immersed in the coolant. Also in this case the end walls of the filter cylinder may be imperforate.

What I claim and desire to secure by Letters Patent is:

1. An apparatus for establishing contact between a liquid and a gas, comprising a cylindrical container having a circumferential wall and end walls, said container being packed with hollow filling bodies and mounted for rotation about a horizontal axis, at least the circumferential wall of the cylindrical container being perforated so that the liquid and the gas can flow therethrough, the hollow filling bodies being of sufficiently light weight to support the cylindrical container when said container is partially immersed in the liquid, said cylindrical container being substantially completely filled with said filling bodies.

2. An apparatus according to claim 1, wherein both the circumferential wall and the end walls of the cylindrical container are perforated.

3. An apparatus according to claim 1, wherein the horizontal axis includes a hollow shaft provided with orifices for injection of gas into the cylindrical container.

4. An apparatus as claimed in claim 1, wherein means arranged inside, outside or both inside and outside the cylindrical circumferential wall of the container are adapted, upon rotation of the cylinder partially immersed in a liquid, to raise the liquid above the liquid level, and upon continued rotation of the cylinder to pour said liquid over the filling bodies.

5. An apparatus as claimed in claim 1, wherein means arranged inside, outside or both inside and outside the cylindrical circumferential wall of the container are adapted, upon rotation of the cylinder partially immersed in a liquid, to entrain air into said liquid, and upon continued rotation of the cylinder to deliver the air to the liquid below the filling bodies.

6. An apparatus according to claim 1 wherein said cylinder includes a shaft in common with said horizontal axis, and means for coupling together two or more such cylinders to permit simultaneous rotation thereof.

7. An apparatus according to claim 1 wherein said filling bodies are spherical hollow bodies.

8. An apparatus according to claim 7 wherein said filling bodies are plastic balls.

9. An apparatus according to claim 7 wherein said cylinder has a diameter of 2 to 3 meters and said filling bodies are plastic balls having a diameter of 38 mm.

* * * * *